UNITED STATES PATENT OFFICE.

JAMES PLINY PERKINS, OF YONKERS, NEW YORK.

COMBINED RED PIGMENT AND PAINT BASE.

SPECIFICATION forming part of Letters Patent No. 429,054, dated May 27, 1890.

Application filed April 19, 1889. Renewed March 6, 1890. Serial No. 342,914. (No specimens.)

*To all whom it may concern:*

Be it known that I, JAMES PLINY PERKINS, a citizen of the United States, residing at Yonkers, in the county of Westchester and State of New York, have invented certain new and useful Improvements in a Combined Red Pigment and Paint Base; and I do hereby declare the following to be a full, clear, and exact description of the invention, such as will enable others skilled in the art to which it appertains to make and use the same.

My invention consists in the hereinafter-to-be-described product or composition of matter to be used as a pigment or paint base, or as a combined red pigment and paint base.

The aforesaid product or composition of matter consists of an intimate mixture of ferric oxide and separated or precipitated silica, and it forms a red pigment of the class commonly known as "Venetian reds." The shade or red produced can be varied by varying the proportions of the constituent parts; but when these are combined in the proportions preferred, of about twenty-five parts silica to seventy-five parts ferric oxide, a bright red pigment of the most desirable shade is produced. It is of soft nature and can easily be ground to an inpalpable smooth powder. It has strong and lasting coloring powers. It mixes and blends easily with other pigments and grinds perfectly with oil. The ground pigment is free from grit and of unusual smoothness.

The advantages which my invention possesses over any pigment or paint base which can be produced by mixing ferric oxide with ordinary ground silica are due to the fact that in its separated or precipitated condition silica is finer and more pulverulent than it can be when produced by the most complete grinding of quartz rock or quartzose mineral, for the particles thus obtained by grinding will consist of particles of large crystals, and these will not be of the soft nature necessary to make a perfect paint base or pigment. In the separated or precipitated condition, also, silica is opaque, while the minute particles of crystals or of crystalline rock obtained by grinding would be transparent or translucent. Consequently it is believed that this is the reason why the pigments formed by this intimate mixture of separated or precipitated silica and ferric oxide are so much more pronounced in color than the weaker lighter shades produced by mixing ordinary Venetian reds with ground silica, which diffuses or dilutes the color, so to speak. The separated or precipitated silica is apparently neutral so far as concerns the dimming or otherwise affecting the coloring action of the ferric oxide when the two are mingled in substantially the proportions named. While not prepared to give a positive reason for this result, I am inclined to believe that it is due to the fact that the separated or precipitated silica is in so finely a comminuted condition that it to a large degree occupies the interstices between the particles of ferric oxide without separating the latter, and thereby diffusing the coloring-matter, as do the larger particles of crystalline silica produced by the ordinary process of grinding.

My invention as above described may be produced commercially in a number of ways; but the preferred process is the following: Silicious ferruginous slag, most commonly found as a by-product in the manufacture and working of wrought-iron, is used as the raw material. The best quality of this slag is produced in puddling and reheating furnaces. It is nearly black in color and of great specific gravity, and consists of nearly pure silicate of iron mixed with ferrous oxid. This slag, as above described, I pulverize in any suitable pulverizing apparatus to a degree of fineness known in the art as "one hundred and ninety mesh," or less. It is not necessary that it should be pulverized to a degree finer than that, and my process may be carried out with a fair degree of success with slag ground to a lesser degree of fineness than that mentioned.

The second step consists in treating slag pulverized as above described with sulphuric acid. The acid may be mixed with the pulverized slag in the ordinary way by stirring with spades or paddles, or in any suitable mechanical mixer or mixing-machine. The amount of sulphuric acid to be mixed with a given quantity of pulverized slag varies according to the quality of the slag and the particular shade of color which it is desired the resulting pigment shall present. In general, however, I find that with the average slag and the average quality of acid the best results are obtained when the proportion, by weight, of the acid to the slag is as one to three. In certain cases, however, a higher proportion of acid than that of one to three may be necessary. The acid may be used undiluted in its commercial form of oil of vitriol, or it may be diluted with water, and I prefer this method of applying it, as its action is slower, more moderate, and more uniformly diffused through the mass of pulverized slag. When undiluted, the action of the acid is intense, local, and uneven. It attacks too violently those particles with which it first comes in contact, and being absorbed by these does not get to other particles.

Another method of obtaining the same effect as that resulting from the dilution of the acid is to dampen or moisten the pulverized slag. The perceptible effects of this, the second step, are the liberation of heat and the caking or solidification of the mass of slag. What was formerly a fine powder becomes a solid mass, though brittle and easily broken up. The color of the mass changes from the dark shade which the slag had after pulverization to a gray or whitish tinge. If water is used to dilute the acid, as above described, a considerable quantity of steam is given off during this step of my process, and if the acid is used in undiluted form a certain amount of steam is still given off during this step of the process.

The third step consists in heating the substance produced by the steps hereinbefore described to a red heat in any suitable furnace. The caked mass remaining after the completion of the second step of the process should be broken up, so as to be capable of convenient handling and introduction into the furnace. The furnace should be so constructed as to permit the escape of the fumes given off on heating the charge and to allow access of air when desired. The result of the process of treating slag as above set forth is the before-described bright-red pigment in which my invention consists. Chemical analyses of this product show that it consists of an intimate mixture of ferric oxide and amorphous silica in the proportion of about twenty-five parts silica to about seventy-five parts of the oxide. Considerable variations from these proportions still give pigments of desirable shades of red; but the most enduring pigment of the most popular of the colors known as "Venetian reds" is that resulting from the admixture of these elements in the above-named proportions of twenty-five to seventy-five.

Having therefore described my invention, what I claim as new, and desire to protect by Letters Patent, is—

The within-described combined red pigment and paint base, consisting of an intimate mixture of ferric oxide and separated or precipitated silica, in substantially the proportions mentioned.

In testimony whereof I affix my signature in presence of two witnesses.

JAMES PLINY PERKINS.

Witnesses:
G. W. BALLOCH,
W. H. WALKER.